(12) United States Patent
Biskeborn

(10) Patent No.: US 7,486,475 B2
(45) Date of Patent: Feb. 3, 2009

(54) MAGNETIC DATA SYSTEM HAVING BIAS CIRCUIT WITH BIAS RESISTOR

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/304,440

(22) Filed: Dec. 14, 2005

(65) Prior Publication Data

US 2007/0133130 A1    Jun. 14, 2007

(51) Int. Cl.
G11B 5/265 (2006.01)
G11B 5/29 (2006.01)

(52) U.S. Cl. .................. 360/121; 360/66; 360/323; 360/128

(58) Field of Classification Search .................. 360/66, 360/121, 316, 128, 323
See application file for complete search history.

(56) References Cited

U.S. PATENT DOCUMENTS

| | | | | |
|---|---|---|---|---|
| 4,802,043 A * | 1/1989 | Sato et al. | ................... | 360/316 |
| 5,270,882 A * | 12/1993 | Jove et al. | ..................... | 360/67 |
| 5,309,295 A | 5/1994 | Bailey et al. | ................... | 360/66 |
| 5,701,213 A | 12/1997 | Cameron et al. | .............. | 360/66 |
| 6,252,735 B1 | 6/2001 | Chung et al. | ................... | 360/67 |
| 6,342,986 B2 | 1/2002 | Nguyen | ....................... | 360/75 |
| 6,356,404 B1 | 3/2002 | Nguyen | ....................... | 360/66 |
| 6,490,112 B1 | 12/2002 | Ranmuthu et al. | ............ | 360/66 |
| 6,847,501 B2 | 1/2005 | Cheung et al. | ................ | 360/46 |
| 2003/0016474 A1* | 1/2003 | Biskeborn | ................... | 360/319 |

* cited by examiner

*Primary Examiner*—A. J. Heinz
(74) *Attorney, Agent, or Firm*—Zilka-Kotab, PC

(57) ABSTRACT

A magnetic data system according to one embodiment includes at least one reader formed above a substrate, the at least one reader further comprising a shield and a magnetoresistive (MR) sensor. A first circuit sets a voltage (Vsub) of the substrate to about a voltage (Vshield) of the shield of the at least one reader.

17 Claims, 5 Drawing Sheets

MAGNETIC DATA SYSTEM HAVING BIAS CIRCUIT WITH BIAS RESISTOR

FIELD OF THE INVENTION

The present invention relates to magnetoresistive (MR) devices, and more particularly, this invention relates to an MR device having an electrically biased substrate.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the readers and writers, such as by using thin-film fabrication techniques and MR sensors.

The interleaved R/W magnetic tape head with MR sensors allows increased track density on the tape medium while providing bi-directional read-while-write operation of the tape medium to give immediate read back verification of data just written onto the tape medium. Tape recording systems may alternatively implement arrays of "piggyback" R/W pairs, where the writer and reader in each pair are aligned in the direction of tape travel.

In any of the above-mentioned types of heads, e.g., AMR, GMR, MTJ, etc., several forces are in play. Particularly, the tape acquires a charge as it moves through the tape path and over the head. In the head, the sensor element potential is generally set by virtue of the circuit that provides the sensing current passing therethrough. The sensor shields may or may not have a potential matching the sensor element. Further, the sensor shields and other parts of the head may become charged by interaction with the tape. Thus, as can be appreciated, multiple and varying voltage differentials may be found not only between the tape and the head, but also between various components in the head, e.g., substrate, shields and sensor element. As will soon become apparent, these voltage differentials are believed to be at least partly responsible for adverse tribological interactions on the head.

Compounding the problem is the electric field distribution in the head ceramic. The wafer material used for magnetic recording head substrates and closures (commonly know as AlTiC), is a ceramic composite material consisting of a matrix of insulative aluminum oxide (alumina, $Al_2O_3$) plus an irregular but interconnected network of electrically conductive titanium carbide (TiC). The uneven distribution of TiC creates an irregular electric field at the interface with the typically overlying insulator. The electric fields at grain edges can be several folds higher than the average field. These high fields are associated with adverse tribological effects, including electrostatic debris deposition and pitting of the head insulator due to electric discharges. These high fields also promote electrical discharge into the tape, thereby charging the tape.

Due to the varying voltage differentials and irregular electric fields between the various parts of a head as well as between head and tape, magnetic heads tend to suffer from adverse tribological interactions, which include electrical discharge, tape changes, head erosion, debris buildup, chemical conversion, head sensor shorting, etc. In both piggyback and interleaved heads, tribological effects are believed to be aggravated by excessive substrate and/or media voltages. When the substrate is electrically floating, relative motion between the head and recording medium may produce substrate and media voltage swings on the order of several 10 s of volts. Such voltages are strongly implicated in unfavorable tribological processes such as electrochemical reactions, electrostatic accumulation of debris, and even certain types of wear.

In shielded MR heads, the lower reader shield of each reader is in close proximity to the substrate, separated therefrom by a thin insulator on the order of 1 micron thick. The voltage differences between the adjacent reader shield and substrate is problematic due to their close proximity, and is compounded by the potentially large localized electric fields created by a conductive substrate, e.g., of AlTiC. Such electric fields are implicated in aggravated accumulation of conductive materials that can actually short the MR sensor to its shields and in turn to the substrate.

Consider the following example. Suppose reader shield S2 and the substrate are separated by a thin insulator. Suppose S2 is at 1.5 V, and the substrate is at 6.5V. The difference is 5 V. If the space between them is 0.5 microns, the electric field (gradient) is 10V per micron, a very large value. For comparison, sparking in air, for example as observed on clothing, occurs from a gradient of approximately 1V per micron. In the example presented, the gradient is 10× that. Other unusual effects have been observed, including formation of solid water at room temperature in the presence of larger electric fields. Furthermore, the conductive grain structure of AlTiC concentrates the fields, which can be several times higher than in this example.

Several solutions have been contemplated, but each of these have drawbacks. These solutions include connecting the substrate directly to ground. However, if the reader shields are not clamped to ground, the voltage differential leads to the aforementioned tribological effects between the shields and substrate. Grounding the shields in a multi-sensor head is generally impractical. Even if the shields are grounded, adverse tribological effects may occur depending on the tape electrical and mechanical characteristics and other aspects of the tape path, such as ground or floating of guides.

Another problem encountered is that the readers are susceptible to shield-shorting which may occur in combination with substrate shorting, as a result of running magnetic recording tape having insufficient lubricity across the head at very low humidity, which in turn is found to produce accumulations of conductive material on the MR element, shields and substrate. Shorting is a well-known cause of reading errors. Proposed solutions, such as prerecessing and/or insulating heads, providing sensor-piggybacked fences and running ionization fans, require changes in head processing, design or implementation, respectively, and so are far more involved than the present invention. For instance, forcibly recessing the sensor so that its components do not develop the conductive accumulation is difficult to manufacture, and also generally produces undesirable spacing loss for the data readers, which must read much higher frequencies than the servo readers.

There is accordingly a clearly-felt need in the art for a magnetic device with reduced susceptibility to shorting and/or improved tribological characteristics. These unresolved problems and deficiencies are clearly felt in the art and are solved by this invention in the manner described below.

SUMMARY OF THE INVENTION

A magnetic data system according to one embodiment includes at least one reader formed above a substrate, the at least one reader further comprising a shield and a magnetoresistive (MR) sensor. A first circuit sets a voltage (Vsub) of the substrate to about a voltage (Vshield) of the shield of the at least one reader. Because the substrate and shield are at similar voltage levels, tribological effects such as wear, corrosion and accumulations are reduced. Further, the probability of an electrical discharge, e.g., spark, occurring between the shield and the sensor is minimized.

A magnetic data system according to another embodiment includes at least one reader formed above a substrate, the at least one reader further comprising a shield and a magnetoresistive (MR) sensor, the substrate being at about a voltage (Vsub). A mechanism operatively adjusts a voltage (Vshield) of the shield of the at least one reader to about match the Vsub.

A magnetic data system according to yet another embodiment includes a plurality of readers formed above a common substrate, each of the readers further comprising a shield and a magnetoresistive (MR) sensor. A first circuit sets a voltage (Vsub) of the substrate to about a voltage (Vshield) of at least one of the shields. A plurality of second circuits are also present, each second circuit being coupled to one of the readers, the second circuit setting Vshield to about a voltage of the MR sensor of the associated reader.

A magnetic data system according to a further embodiment includes a plurality of readers formed above a common substrate, each of the readers further comprising a shield and a magnetoresistive (MR) sensor. A first circuit sets a voltage (Vsub) of the substrate to a predetermined level, which is not necessarily Vshield or the MR sensor voltage. A plurality of second circuits are present, each second circuit being coupled to one of the readers, the second circuit setting the voltage (Vshield) of the shield to about a voltage of the associated MR sensor. A bias circuit is coupled to each of the readers for passing an MR bias current through the MR sensor thereof, the second circuit of each reader being coupled to the bias circuit of the associated reader. A mechanism adjusts Vshield of at least some of the readers to about match the Vsub.

Any of these embodiments may be implemented in a tape drive system, which may include a magnetic head as recited above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
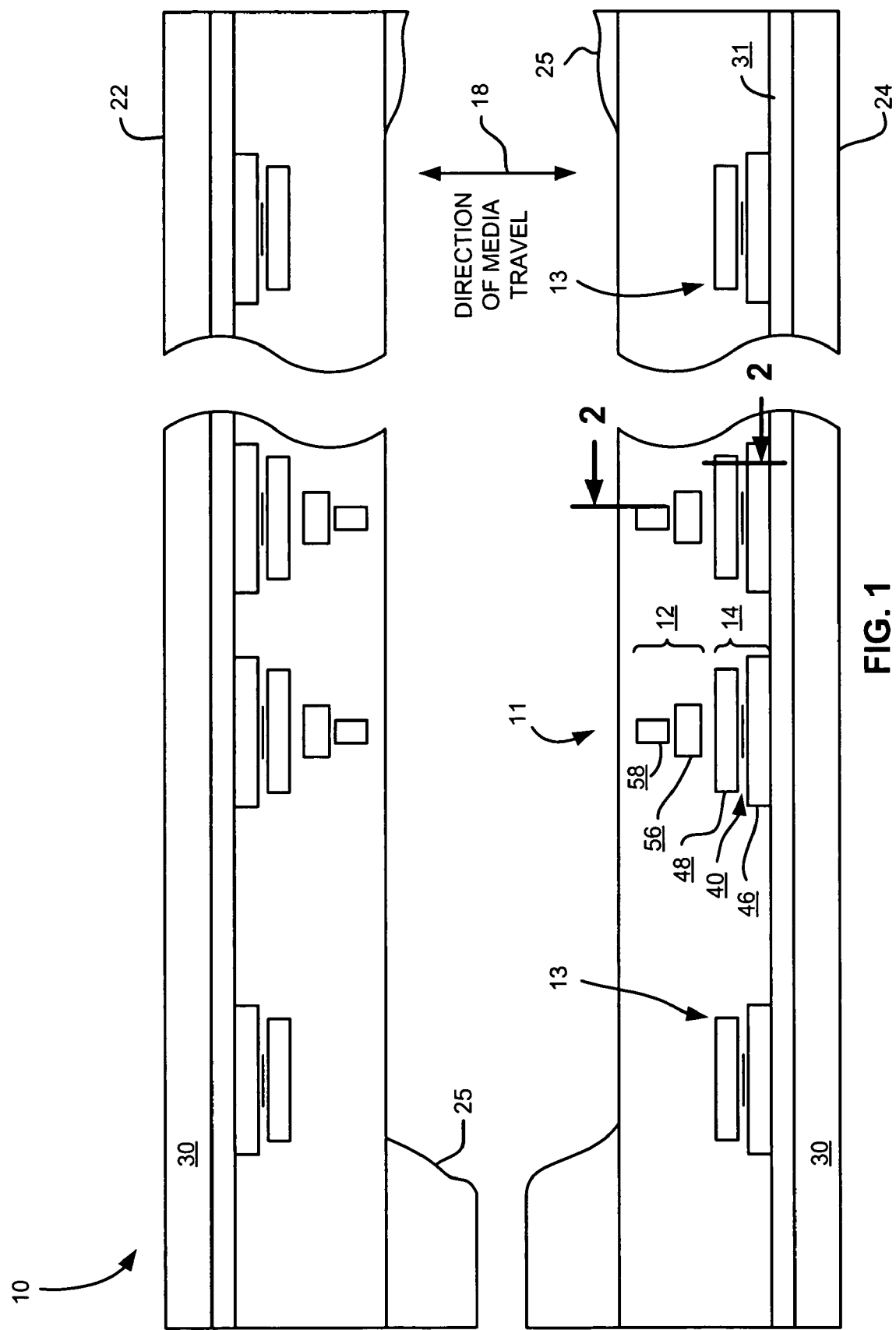
FIG. 1 is a representative tape bearing surface view of a multitrack tape head having a multitude of R/W pairs in a piggyback configuration according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The present invention reduces susceptibility to shorting and improves tribological characteristics in MR devices such as magnetic heads by matching as closely as possible the substrate and shield voltages. Accordingly, should debris accumulate and create a short from the sensor to the substrate, the low or nonexistent voltage differential therebetween greatly mitigates the effects of such a short.

It should be noted that while much of the following description is presented in terms of a magnetic data system having a R/W head in a piggyback configuration, the teachings herein are applicable to other types of magnetic data systems including those implementing interleaved heads.

FIG. 1 shows the tape bearing surface (TBS) of an embodiment of a magnetoresistive (MR) head assembly 10 having a plurality of R/W pairs in a piggyback configuration formed on a common substrate 30 and an optional electrically insulative layer 31. The writers, exemplified by the write head 12 and the readers, exemplified by the read head 14, are aligned parallel to a direction of travel of a tape medium thereacross to form a R/W pair, exemplified by the R/W pair 11. Several R/W pairs 11 may be present, such as 8, 16, 32 pairs, etc. The R/W pairs 11 as shown are linearly aligned in a direction generally perpendicular to a direction of tape travel thereacross. However, the pairs may also be aligned diagonally, staggered, in a V-shape, etc. Servo readers 13 are positioned on the outside of the array of R/W pairs, the function of which is well known.

Generally, the magnetic tape medium moves in either a forward or reverse direction as indicated by arrow 18. The magnetic tape medium and head assembly 10 operate in a transducing relationship in the manner well-known in the art.

The piggybacked MR head assembly 10 includes two thin-film modules 22 and 24 of generally identical construction. Modules 22 and 24 are joined together with a space or gap present between modules 25 thereof (partially shown) to form a single physical unit to provide read-while-write capability by activating the writer of the leading module and reader of the trailing module aligned with the writer of the leading module parallel to the direction of tape travel relative thereto.

When a module 22, 24 of a piggyback head 10 is constructed, layers are formed on an electrically conductive substrate 30, e.g., of AlTiC, in generally the following order for the R/W pairs 11: an insulating layer 31, a first shield 46 typically of an iron alloy such as NiFe (permalloy), CZT or Al—Fe—Si (Sendust), a sensor 40 for sensing a data track on a magnetic medium, a second shield 48 typically of a nickel-iron alloy (e.g., 80/20 Permalloy), first and second writer pole tips 56, 58, and a coil (not shown). The first and second writer poles 56, 58 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 2:
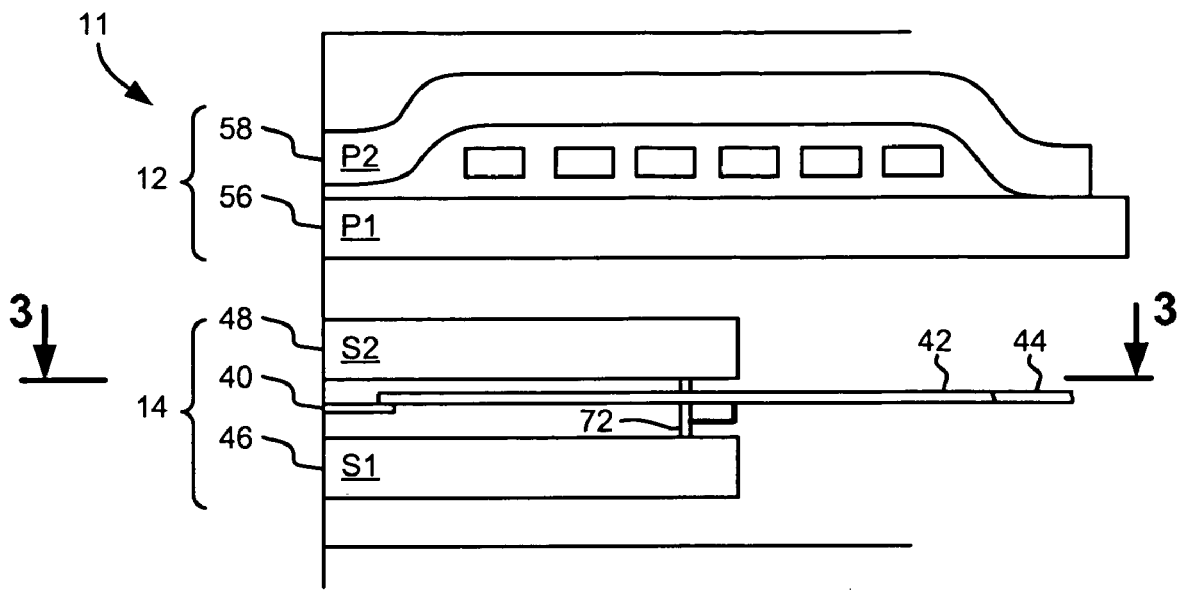
FIG. 2 is a partial cross sectional view taken from Line 2-2 of FIG. 1.

FIG. 2 represents in detail a portion of module 22 from FIG. 1, including portions of an exemplary R/W pair 11. The thin-film elements shown in FIG. 2 are illustrated showing submicron detail in the usual manner and are not to scale. The reader 14, which may be a magnetoresistive (MR) sensor element 40 (e.g., MR, GMR, AMR, MTJ, etc.) is disposed between the two shields 46 and 48 (S2 & S1), with each MR sensor end coupled to an electrical lead conductor 42 and 44. The relative disposition of electrical lead conductors 42, 44 may be better appreciated with reference to FIG. 3, which illustrates a cross-sectional view of the reader 14 from FIG. 2 taken along section line 3-3.

With continued reference to FIG. 2, in tape systems, the shields 46, 48 can become charged by the action of the tape brushing thereacross. If the shields 46, 48 are floating (not connected or grounded), they may charge up to a high voltage (e.g., 10V or higher), then discharge, potentially through the MR sensor 40. The backside of the tape does not have a magnetic coating. Rather, the backside of the tape is electrically conductive and is rougher than the magnetic side. The roughness assists in winding the tape onto a reel. To make the backside of the tape conductive and rough, carbon particles are formed thereon. The carbon itself can flake off and run across the tape-head interface, creating electrically conductive bridging. The particles can create enough of a bridge to initiate a discharge of the shield into the sensor, creating a spike in the signal.

A charge clamp circuit removes the charge, and sets the voltage (Vshield) of the shield at roughly the same voltage as the sensor, as described immediately below.

Figure 3:
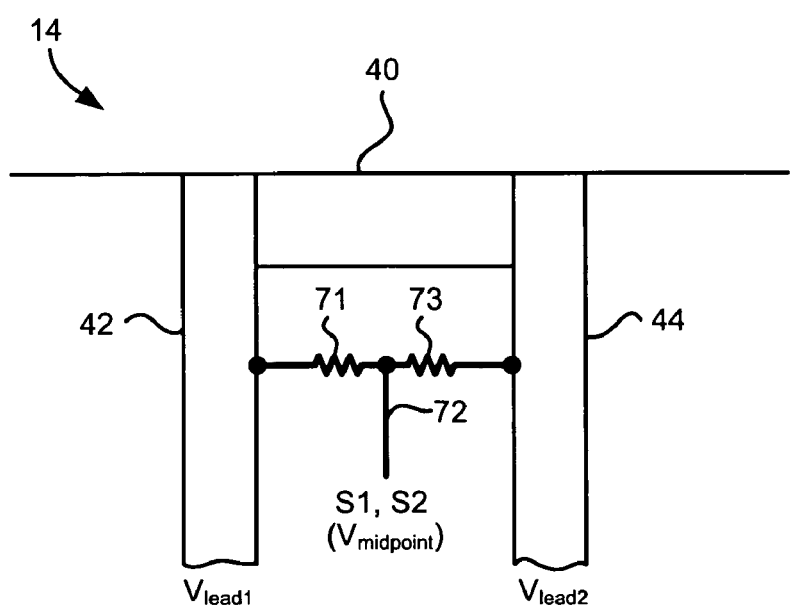
FIG. 3 is a partial cross sectional view taken from Line 3-3 of FIG. 2.

According to an embodiment of the invention, within each read head, which is exemplified by reader 14, MR element shields 46, 48 may also be connected to the leads 42, 44 of the sensor 40 via a circuit 72 in a configuration referred to as a charge clamp, as shown in FIGS. 2 and 3. As shown in FIG. 3, resistors 71, 73 are positioned between the leads 42, 44, thereby forming a conducting path from leads 42 to 44. The resistor 71, 73 must be large enough so as not to short circuit the MR reader. Resistors 71, 73 are preferably of equal magnitude for reasons which will soon become apparent, but may be of differing magnitude. The resistors 71, 73 may have a resistance of less than about 500 kilo-Ohms (kOhms). Also note that resistors 71, 73 (and all other resistors described herein) may each be formed of multiple resistors, active resistors, tunable resistors etc.

The shields 46, 48 are coupled to the circuit at a point between the resistors 71, 73. The circuit acts as a voltage divider, where the voltage (Vshield) of the shields is at a level near a midpoint between the lead voltages, e.g., $V_{midpoint} = (V_{lead1}+V_{lead2})/2$. This midpoint is about the voltage of the midpoint of the sensor 40 between the leads 42, 44. Thus, the sensor 40 and shields 46, 48 are at about the same voltage. As noted above, voltage differentials on MR devices are strongly implicated in unfavorable tribological processes such as electrochemical reactions and electrostatic accumulation of debris. Because the sensor 40 and shields 46, 48 are at about the same voltage level, tribological effects such as corrosion and accumulations are reduced. Further, the chance of an electrical discharge between the shields 46, 48 and the sensor 40 is minimized.

The electrical connections exemplified by charge clamp circuit 72 (FIG. 2) may be made independently for each reader-writer pair. Charge clamp circuit 72, or portions thereof, are preferably non-magnetic and may be formed by depositing a layer of conductive metal, such as tantalum, or any other useful material of high to intermediate resistivity. The charge clamp circuit 72, or portions thereof, can also be formed by creating a via which is filled with an electrically conductive material such as copper or gold.

Figure 4:
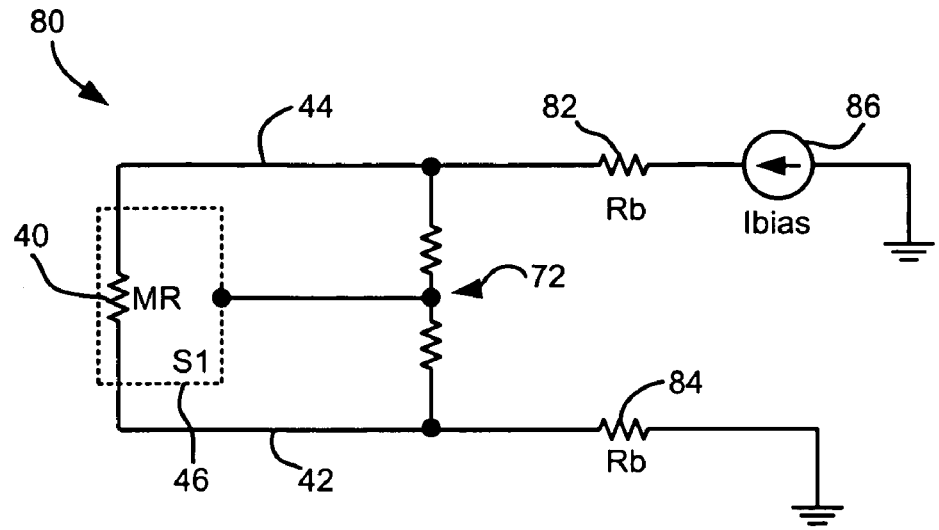
FIG. 4 is a circuit diagram of an MR bias circuit according to one embodiment of the present invention.

FIG. 4 illustrates a MR bias circuit 80 according to one embodiment. The MR bias circuit 80 includes the leads 42, 44 coupled to the sensor 40 and the charge clamp circuit 72 coupling the shield 46 to the leads 42, 44. Biasing resistors (Rb) 82, 84 are positioned between the bias current source 86 and sensor 40, and sensor 40 and ground, respectively.

As mentioned above, the charge clamp circuit sets Vshield to about the voltage of the sensor. A substrate biasing circuit sets the wafer substrate voltage (Vsub) to some voltage level that approximates the Vshield of one or more of the shields. The substrate biasing circuit may be a divider network with resistance values carefully chosen, as explained in the next section. For instance, the Vsub may be set close to the design (target) or actual Vshield of a specific reader. Vsub may also be set to an average Vshield of two or more readers. Vsub may also oscillate between the Vshields of two or more readers.

Note that the closure portion is generally electrically coupled to the substrate portion by a connection (via) in the wafer insulator or by an external conductor, such as silver paint, between the two. Thus, the substrate biasing circuit may also set the voltage of the wafer closure piece as well.

The voltage matching of the present invention is believed to provide several benefits by mitigating the electric field between the reader shield and substrate. This is desirable because the formation of conductive bridges appears to be driven at least in part by electric fields. Should a bridge develop, provided it does not have very low resistance (<50 kOhms), which is rarely if ever observed, then negligible common mode current will flow into the shields, because of the small potential difference between substrate and shields. Additionally, because Vshield and Vsub are at comparable voltage levels, tribological effects such as corrosion and accumulations are reduced. Further, the probability of an electrical discharge occurring between the shields and the substrate is minimized.

The foregoing presumes that the substrate is electrically conductive. An illustrative substrate is formed of AlTiC, which is electrically conductive.

Figure 5A:
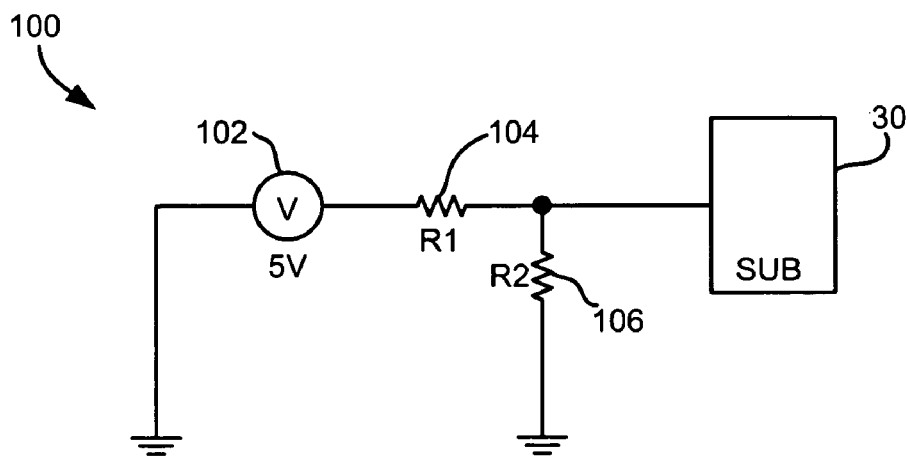
FIG. 5A is a circuit diagram of a substrate biasing circuit according to one embodiment of the present invention.

FIG. 5A depicts a substrate biasing circuit 100 according to one embodiment. As shown, the substrate biasing circuit 100 includes a series resistance to ground, effected between a voltage source 102 and ground by a pair of resistors R1 and R2 104, 106. The circuit 100 is coupled to the substrate 30 at a point between the resistors (R1, R2) 104, 106, and thereby is able to set Vsub to about the level of Vshield.

The power supply in the drive can be used as the voltage source 102. In this example, the power supply is 5V, but a source providing any desired value can be used. The power supply has zero input impedance, so looking back into circuit from the substrate 30, the circuit appears to have resistor R1 104 in parallel with resistor R2 106.

For a given system, the design Vshield is known, so the resistance values for resistors R1 and R2 104, 106 and/or the source voltage can be selected to make Vsub about match the design Vshield. Then, to fine-tune the voltage matching, either the source voltage in the substrate biasing circuit 100 can be adjusted, or each of the MR bias currents can be adjusted to make the Vshield of each shield about match Vsub. In the latter case, where the MR bias currents are adjusted, any resulting signal asymmetry is compensated for in the drive.

Vshield can be calculated for each sensor by measuring the resistance of the sensor, then performing a simple calculation that considers the MR bias source, bias resistors (Rb), charge clamp resistor values, and/or resistance of the sensor. Many existing tape drive systems already have the capability of determining the MR sensor resistance. The calculations can be used to adjust the MR bias current to make Vshield match Vsub.

Another embodiment of the present invention calculates the estimated low and high Vshield values and oscillates Vsub between two voltage levels, such as about the estimated low and high Vshield values at a few hertz (Hz), e.g., 5-1000 Hz. One such embodiment may include the circuit 105 of FIG. 5B, which includes an oscillating voltage source 107 (Vosc). Note that the high and low voltage levels need not be based on the Vshield values. Also note that the frequency of oscillation can be increased beyond the illustrative range, but is preferably not in the detection band of the servos of the readers. To create the oscillation, an alternating current (AC) component is simply added to the voltage source of the substrate biasing circuit, such that the DC level is any desired value (not only zero).

Figure 5B:
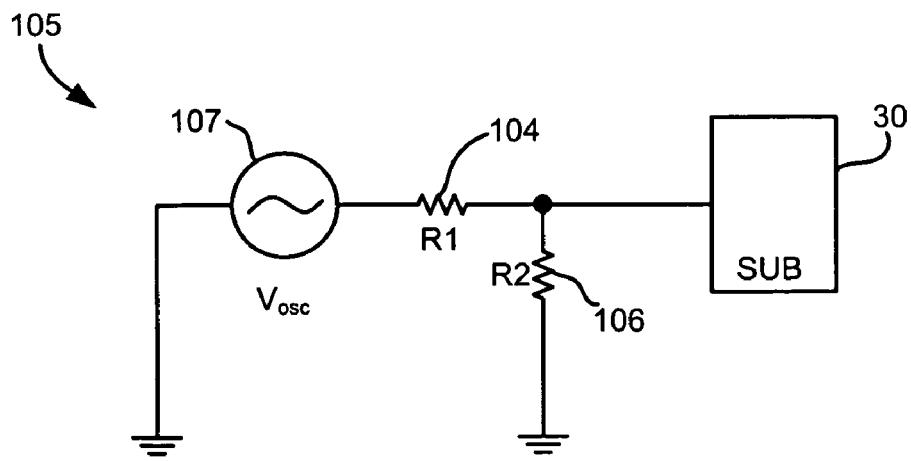
FIG. 5B is a circuit diagram of a substrate biasing circuit according to one embodiment of the present invention.

The series resistance to ground in the substrate biasing circuits 100, 105 of FIGS. 5A, 5B or equivalent circuit may be in the range of 50-200 times the MR bias circuit individual bias resistor Rb values. For instance, assuming each bias resistor Rb resistance value is 150 Ohms, then the parallel combination of R1 and R2 would have a value of 7500 to 30000 Ohms. By setting this impedance to ground via resistor R1 and R2 104, 106, a debris bridge of say a few kOhms between the substrate and shield in series with an additional bridge between the sensor element and the shield at worst would draw only a small portion of the MR bias current through the substrate path to ground. Making the resistors R1 and R2 104, 106 larger might seem preferable for mitigating current shunting and other problems. Series resistances much larger than the individual Rb values are less preferred, as the substrate voltage may begin to be affected by tribocharging from the tape. For example, the tape itself may become charged by the motion of the tape through the drive and over the head. This phenomenon is commonly referred to as tribocharging. As a result, substrate currents of the order of up to several microamperes may flow between head and tape as depicted in FIG. 6, since the substrate is connected to ground, e.g., via circuit 100 of FIG. 5A.

Figure 6:
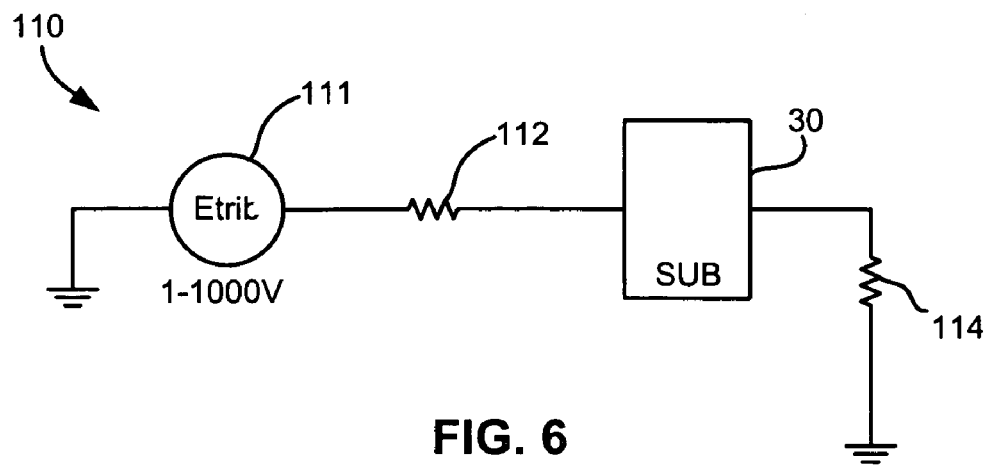
FIG. 6 is a circuit diagram of a tape charging circuit coupled to the substrate according to one embodiment of the present invention.

With reference to FIG. 6, the tape is represented as element 111, and acts as a source of tribocurrent. Since the effective source impedance 112 for this tribocurrent is of the order of 10 s of MegOhms (MOhms), substrate resistances 114 of the order of MOhms would not drop the tribovoltage, which would thus put the substrate in the volts range. Thus, the largest preferred series resistance (e.g., R1, R2 of FIG. 5A) is in the 10-50 kOhm range, assuming an Rb resistance value of about 150 Ohms and Vsub≈Vshield≈1.50V. Higher and lower resistance values and ranges are, however, considered to be within the scope of the present invention.

Another consideration is that in the case there is a short between substrate and shield, the parallel combination of clamp resistors 71, 73 (FIG. 3) effectively shunts resistor R2 106 (FIG. 5A). Thus, it is desirable to make R2 less than about 5 to 10× the parallel combination of clamp resistors 71, 73 (FIG. 3). In an illustrative embodiment, clamp resistors 71, 73 (FIG. 3) are each about 45 kOhms, while R1 104 (FIG. 5A) is 60 kOhms and R2 106 (FIG. 5A) is 15 kOhms. In this case, if the supply of the substrate biasing circuit of FIG. 5A is 5 V, Vsub is about 1.5 V. Further, assuming MR bias resistor Rb values are about 15 kOhms each, and Ibias is about 8-10 mA, Vshield will be about 1.5 V.

Another embodiment is a variation of the circuits of FIGS. 5A-5B. In this embodiment, resistors R1 and R2 are not present. Rather, the voltage source is connected directly to the substrate.

As alluded to above, the sensor shields may be connected to the mid potential of the two leads via clamping resistors, or otherwise set at some potential. The limitation of this alone is that it is not possible to set shield voltages for multiple sensors to precisely the same value due to component tolerances. In other words, if the MR bias currents are all set to 10 mA, all readers may not respond identically. The differences between readers are readily observable by considering the readback asymmetry. Increasing the MR bias current (e.g., above 10 mA) pushes the asymmetry positive, and also increases Vshield. Reducing the bias current (e.g., below 10 mA) pushes the asymmetry negative and also decreases Vshield.

Thus, a modified MR bias circuit can be used for fine tuning the bias of each read sensor until its shield voltage Vshield matches the set substrate voltage Vsub. Any asymmetry is then compensated for in the drive. This solution is readily implemented, as it is entirely electronic.

Another embodiment sets all of the bias currents to the same value. Again, any symmetry can be compensated for in the drive.

A further embodiment changes the bias current of each element individually to regulate asymmetry. Illustrative bias voltage settings can be between 7 to 14 mA for a nominal 10 mA design bias voltage. In this scenario, there is no "standard" shield voltage against which to select a Vsub. One embodiment calculates the average Vshield of two or more readers based on an average value of the bias currents, and sets Vsub to the average calculated Vshield.

The circuit that tunes the MR bias of each sensor so that its shield voltage precisely matches the substrate voltage can be a simple programmable current source. The circuit that sets or adjusts the shield voltage may also be a fixed, higher value voltage source and resistance divider, or a regulated voltage source set to the desired value, optionally with a resistor inserted between the source and head to minimize the impact of conductive bridges.

Figure 7:
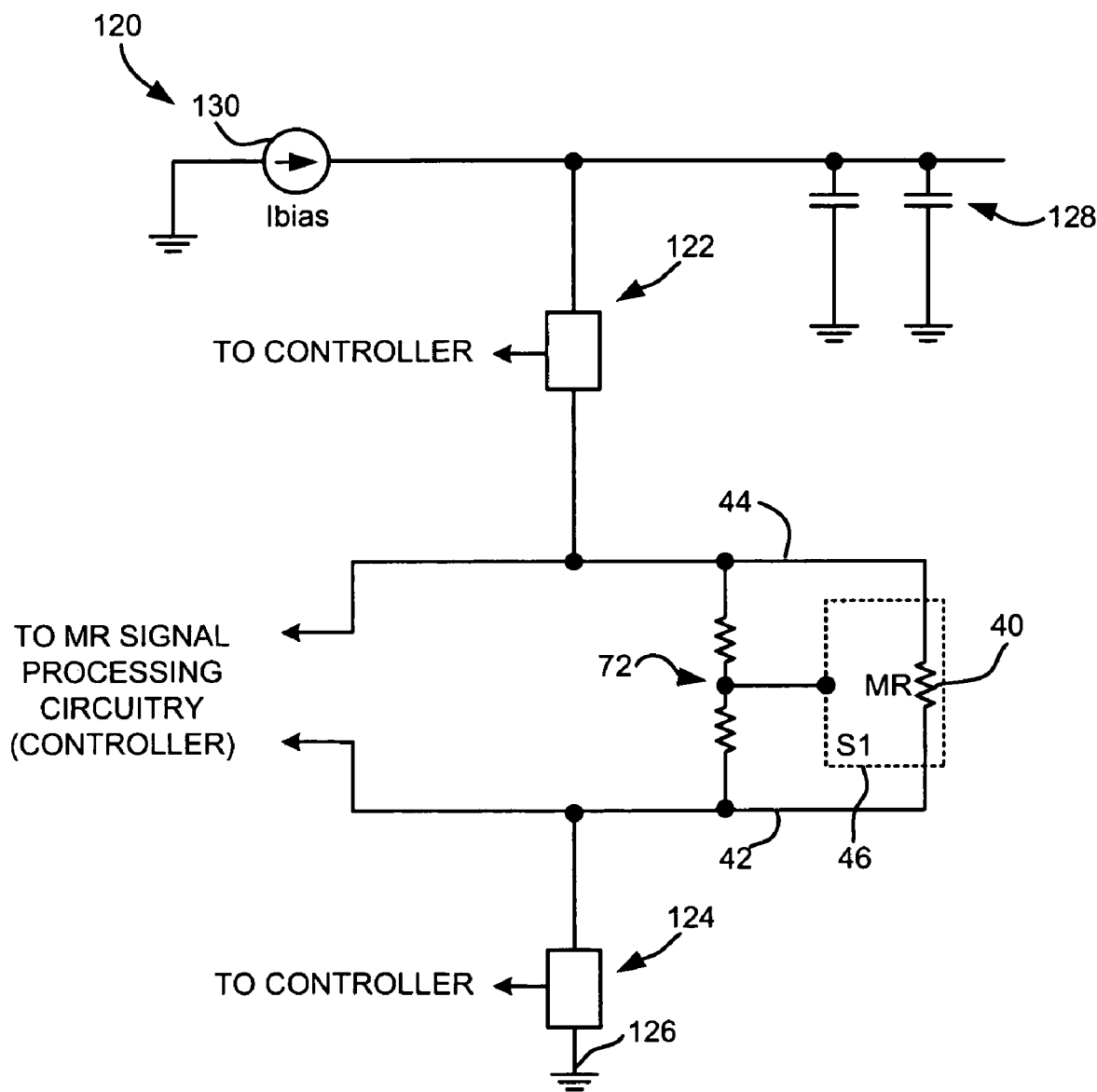
FIG. 7 is a circuit diagram of an MR bias circuit according to one embodiment of the present invention.

An illustrative MR bias circuit 120 for adjusting Vshield is shown in FIG. 7. This circuit 120 allows use of a desired MR bias current (for example, for zeroing asymmetry) but changes the resistance values Rb1, Rb2 of the MR bias resistors 122, 124, respectively, to adjust Vshield. The sensor shields are assumed to be connected to the mid potential of the two leads 42, 44 via clamping resistors.

For common mode rejection, the impedance looking back from the MR sensor 40 should be the same on both legs. Because one side is coupled to ground 126, a virtual ground 128 with large capacitors is present on the current inlet side of the circuit 120.

The equation to determine Vshield is:

$$V\text{shield} = [(\tfrac{1}{2}Rmr) + Rb] \times I\text{bias}$$

where Rmr is the resistance of the MR sensor 40 and Ibias is the bias current level at the MR bias current source 130. Accordingly, increasing Rb increases Vshield. Decreasing Rb decreases Vshield.

The MR bias resistors (Rb) 122, 124 can be active resistors, such as transistors (as shown) with a variable input gate source. Other possible MR bias resistors 122, 124 include a voltage controlled resistor, voltage controlled transistor, a switched resistor array, etc. For instance, the gate voltage can be controlled by a controller.

The MR bias resistors 122, 124 can also be formed of a plurality of resistors in series or parallel with appropriate bypasses and/or gates to set the desired resistance. The MR bias resistors 122, 124 are preferably set to matching values in order to maintain a good common mode rejection ratio.

It should be noted that substrate biasing circuits such as those shown in FIGS. 5A-5B can be used even if the shields are not clamped to MR element. In such embodiments, the substrate can be set to a voltage of the MR sensor (as is operatively the case when the shields are clamped to the MR sensor). The voltage of the MR sensor includes not only the midpoint voltage of the MR sensor, but any voltage level thereacross.

Figure 8:
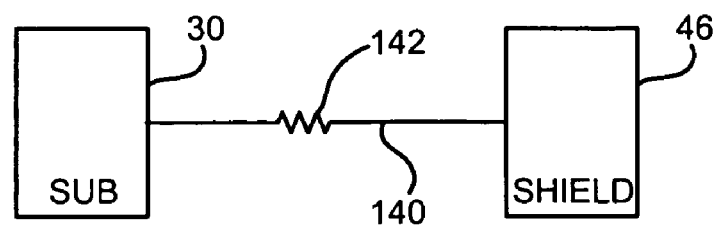
FIG. 8 is a circuit diagram of a direct connection between the substrate and a shield according to one embodiment of the present invention.

In yet a further embodiment, shown in FIG. 8, the substrate 30 is electrically coupled directly to, or operatively to, one of the shields 46, such as via a short circuit 140 or to any other circuit built into the wafer for this purpose. In this embodiment, the substrate bias circuit is not necessary. To minimize the adverse effect of the resultant draw on the MR bias current (because the shield 46 is coupled to the MR bias circuit via the charge clamp), a resistor 142 can be placed on the connection 140 between the substrate 30 and shield 46. The reader to which the substrate 30 is attached can be either a servo reader or data reader. The servo reader is preferred, as any noise resulting from connection to the substrate 30 will have less of an impact on servo reading than the data reading.

The electrical connection 140, or portions thereof, is preferably non-magnetic and may be formed by depositing a layer of conductive metal, such as copper or gold, or any other useful material of low to intermediate resistivity, such as tantalum. The electrical connection 140, or portions thereof, can also be formed by creating a via which is filled with an electrically conductive material such as copper or gold.

Figure 9:
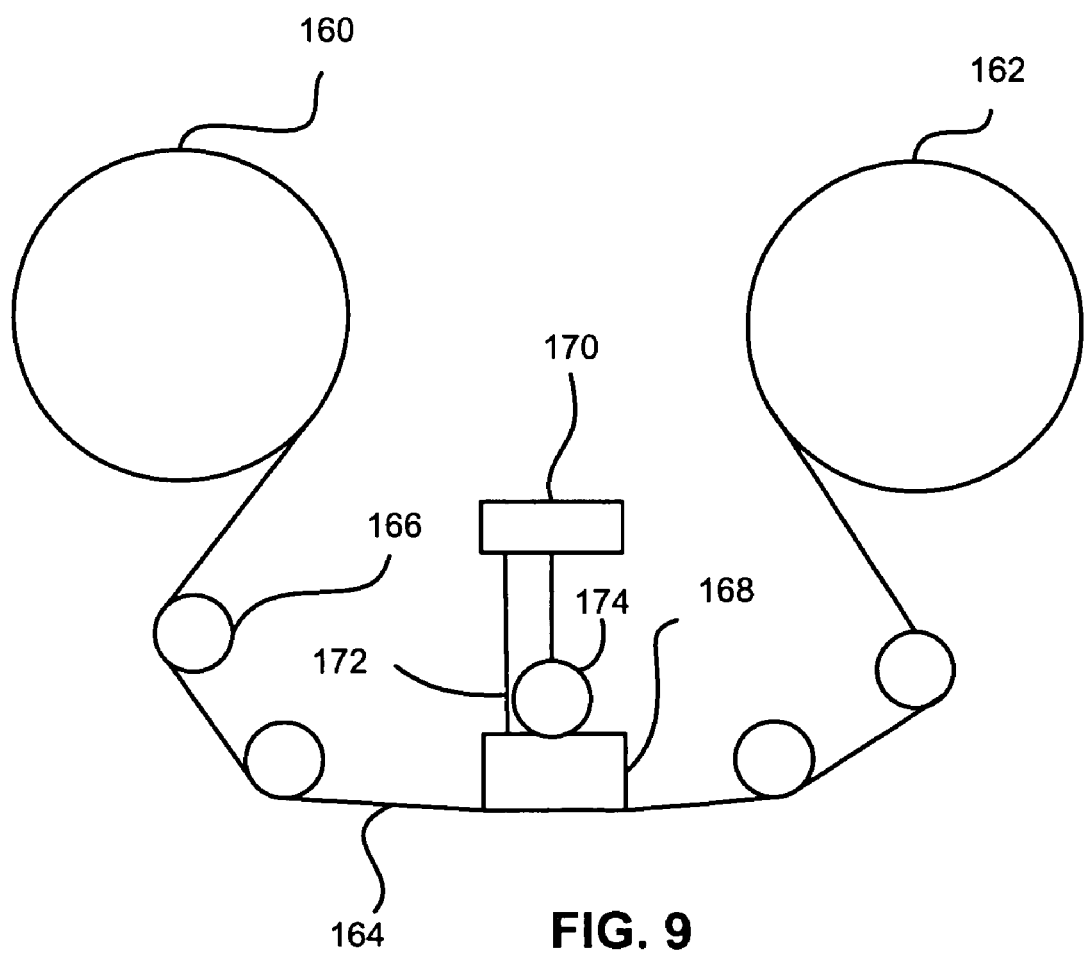
FIG. 9 is a system diagram of a magnetic data system.

FIG. 9 illustrates a simplified magnetic recording system, particularly a tape drive and magnetic recording medium, which may be employed in the context of the present invention. While one specific implementation of a tape drive is shown, it should be noted that the embodiments of the previous figures may be implemented in the context of any type of magnetic data system (e.g., hard disk drive, tape drive, etc.), and including read/write systems, read only systems, etc.

As shown, a tape supply cartridge 160 and a take-up reel 162 are provided to support a tape 164. These may form part of a removable cassette and are not necessarily part of the system. Guides 166 guide the tape 164 across a preferably bidirectional tape head 168, of the type disclosed herein. Such tape head 168 is in turn coupled to a controller assembly 170 via a connector cable 172. The controller 170, in turn, controls head functions such as servo following, write and read functions, etc.

A tape drive, such as that illustrated in FIG. 9, includes drive motor(s) to drive the tape supply cartridge 160 and the take-up reel 162 to move the tape 164 linearly over the head 168. The tape drive also includes a read/write channel to transmit data to the head 168 to be recorded on the tape 164 and to receive data read by the head 168 from the tape 164. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic data system, comprising:
   at least one reader formed above a substrate, the at least one reader further comprising a shield and a magnetoresistive (MR) sensor;
   a first circuit for setting a voltage (Vsub) of the substrate to about a voltage (Vshield) of the shield of the at least one reader;
   a second circuit coupled to the at least one reader for setting a voltage (Vshield) of the shield to about a voltage of the MR sensor; and
   a bias circuit coupled to the at least one reader for passing an MR bias current through the MR sensor thereof, wherein the bias circuit of the at least one reader includes a first bias resistor positioned between a current source and the MR sensor and a second bias resistor positioned between the MR sensor and a ground, wherein resistance values of the bias resistors are adjustable for adjusting the Vshield of the at least one reader to about match the Vsub.

2. A magnetic data system as recited in claim 1, wherein the Vsub is set to about match the Vshield of only one reader.

3. A magnetic data system as recited in claim 1, wherein the Vsub is set to about match an average Vshield of at least two readers.

4. A tape drive system, comprising:

a magnetic head;

a system as recited in claim 1 coupled to the magnetic head;

a drive mechanism for passing a magnetic recording tape over the magnetic head; and a controller electrically coupled to the magnetic head.

5. A magnetic data system as recited in claim 1, further comprising a bias circuit coupled to the at least one reader for passing an MR bias current through the MR sensor thereof, the second circuit being coupled to the bias circuit, wherein the bias circuit for passing the MR bias current through the MR sensor of the at least one reader is able to vary the MR bias current for independently adjusting the Vshield of the at least one reader to about match the Vsub.

6. A magnetic data system as recited in claim 1, wherein the first circuit comprises a conductive path from the shield to the substrate.

7. A magnetic data system as recited in claim 6, wherein the first circuit further comprises a resistor on the conductive path and positioned between the shield and the substrate.

8. A magnetic data system as recited in claim 1, wherein the Vsub is oscillated between two voltage levels.

9. A magnetic data system comprising:

at least one reader formed above a substrate, the at least one reader further comprising a shield and a magnetoresistive (MR) sensor;

a first circuit for setting a voltage (Vsub) of the substrate to about a voltage (Vshield) of the shield of the at least one reader, wherein the first circuit comprises a resistance to ground; and a bias circuit for passing an MR bias current through the MR sensor, the bias circuit comprising a bias resistor, wherein the resistance to ground of the first circuit has a resistance value in a range of between about 50 and 200 times a resistance value of the bias resistor.

10. A magnetic data system, comprising:

at least one reader formed above a substrate, the at least one reader further comprising a shield and a magnetoresistive (MR) sensor, the substrate being at about a voltage (Vsub);

a first circuit for operatively adjusting a voltage (Vshield) of the shield of the at least one reader to about match the Vsub; and a bias circuit coupled to the at least one reader for passing an MR bias current through the MR sensor thereof, wherein the bias circuit of the at least one reader includes a first bias resistor positioned between a current source and the MR sensor and a second bias resistor positioned between the MR sensor and a ground, wherein resistance values of the bias resistors are adjustable for adjusting the Vshield of the at least one reader to about match the Vsub.

11. A magnetic data system as recited in claim 10, wherein the Vsub is set to about match the Vshield of only one reader.

12. A magnetic data system as recited in claim 10, wherein the Vsub is set to about match an average Vshield of at least two readers.

13. A magnetic data system as recited in claim 10, further comprising a second circuit coupled to the at least one reader for setting a voltage (Vshield) of the shield to about a voltage of the MR sensor.

14. A magnetic data system as recited in claim 10, further comprising a bias circuit coupled to the at least one reader for passing an MR bias current through the MR sensor thereof, and a second circuit coupled to the at least one reader for setting a voltage (Vshield) of the shield to about a voltage of the MR sensor, the second circuit being coupled to the bias circuit, wherein the bias circuit for passing the MR bias current through the MR sensor of the at least one reader is able to vary the MR bias current for adjusting the Vshield of the at least one reader to about match the Vsub.

15. A magnetic data system as recited in claim 10, wherein the first circuit comprises a conductive path from the shield to the substrate.

16. A magnetic data system as recited in claim 15, wherein the first circuit further comprises a resistor on the conductive path and positioned between the shield and the substrate.

17. A tape drive system, comprising:

a magnetic head;

a system as recited in claim 10 coupled to the magnetic head;

a drive mechanism for passing a magnetic recording tape over the magnetic head; and a controller electrically coupled to the magnetic head.

\* \* \* \* \*